United States Patent Office 3,144,421
Patented Aug. 11, 1964

3,144,421
EPOXY MOLDING COMPOUND INCLUDING A HIGH MOLECULAR WEIGHT SATURATED FATTY ACID
William T. Yost, Newark, Ohio, assignor, by mesne assignments, to Weyerhaeuser Company, Tacoma, Wash., a corporation of Washington
No Drawing. Filed Apr. 11, 1961, Ser. No. 102,101
20 Claims. (Cl. 260—18)

The present invention relates to dry fusible mineral filler-loaded polyepoxide resin thermosetting molding compositions which are indefinitely stable when stored at temperatures below 45° F., which are stable for several weeks at room temperature and which may be thermoset and simultaneously molded to shape by application of pressure together with temperatures of about 300° F. for a period of from about 3 to about 10 minutes. The thermosetting molding compositions of the invention are particularly characterized by outstanding physical, chemical and electrical properties together with the ability to be cured in contact with a metal mold surface without sticking thereto in the absence of any mold release agent applied to the mold wall.

The present invention is particularly directed to dry fusible mineral filler-loaded polyepoxide resin thermosetting molding compositions comprising in intimate admixture (1) a solid fusible intermediate reaction product of (A) low melting glycidyl polyether having a 1,2-epoxy equivalency greater than 1.0 and (B) aromatic polyamine curing agent for said polyepoxide; (2) high molecular weight fatty acid in an amount of from 0.15 to 0.26% by weight based on the weight of the molding composition; and (3) dry mineral filler in finely divided particulate form.

It is known as demonstrated in the U.S. Patent to De Hoff et al., 2,801,229, dated July 30, 1957, that polyamines will react with polyglycidyl ethers to produce an intermediate fusible resinous product which can be maintained in this intermediate condition for several weeks at about room temperature. It is further known that fusible milled mixture may be prepared containing this fusible resinous product together with fillers and mold release agent to produce a molding powder which may be provided in the form of pellets and the like. In Patent 2,801,229 the filler is vegetable in nature (alpha-cellulose flock) and the mold release agent is a metal fatty acid soap such as calcium stearate in an amount of 1% by weight or more based on the weight of the molding composition.

In the preparation of thermosetting polyepoxide molding compositions having outstanding physical, chemical and electrical properties, it has been found necessary to employ substantial proportions of finely divided mineral filler, e.g., from 25% to 70% by weight based on the weight of the molding composition. With these large proportions of mineral filler, it was found that metal soaps were wholly unsatisfactory because the molding compositions containing these soaps in an amount effective for mold release purposes (1% by weight or more) were unstable. After a few weeks under refrigeration (40° F.), the molding composition (powder or pellets) had advanced to an insufficiently fusible condition to permit molding. At room temperature the molding composition "sets up" to form an unmoldable mass in about a single week. Small molding shops do not possess adequate refrigerated storage space and stocks of molding composition had to be kept to a minimum permitting prompt consumption.

As is known, carboxylic acids are reactive with polyglycidyl ethers, particularly in the presence of nitrogenous materials such as amines (see Segal et al. Patent 2,604,-464, dated July 22, 1952). Despite this known reactivity, it was unexpectedly found that high molecular weight fatty acids could be incorporated in the polyepoxide-aromatic polyamine-mineral filler-loaded molding powders of the invention in very small amounts without deleterious effect. Surprisingly, within a very narrow range of proportions and in proportions at which metal soaps of these same fatty acids are relatively ineffective, the fatty acids of the invention provide an effective mold release action.

Uniquely, the molding compositions of the invention are substantially more stable in the presence of the fatty acid than in the presence of the metal soap of the fatty acid. In fact, compositions containing fatty acid (stearic acid) in accordance with the invention are indefinitely stable and have been maintained at temperatures of 45° F. for periods of over a year (18 months) without loss of moldability. The compositions of the invention have improved stability at room temperature (76° F.) in contrast to an approximate one week stability when the metal soap is employed. In fact, the compositions of the invention have been maintained in satisfactory condition in excess of 6 weeks during the summer when the temperature during the day rose frequently to 85° F. to 90° F. and higher.

Interestingly, when the fatty acids of the invention are employed in proportions substantially greater than about 2% by weight some molded parts will occasionally show a surface exudation of stearic acid. While up to about 2% of the fatty acid represents a usable amount it is generally preferred to use from 0.15% to about 1.5% to reduce the possibility of surface exudation.

The normally liquid glycidyl polyethers having a 1,2-epoxy equivalency of about 2.0 are preferred. Particularly preferred polyepoxides for use in accordance with the invention contain glycidyl groups and aromatic groups united through ether oxygen. Bis-phenol A (2,2'-diphenylol propane) is a particularly preferred polyhydric phenol to constitute the aromatic portion of the polyepoxide backbone.

Polyepoxides which are liquid at room temperature are of importance to the invention to permit intimate admixture between the components of the molding composition to be achieved in the absence of solvent (which is difficult to completely remove) and without employing external heat which tends to cause the mixture to advance to an infusible condition. Refrigeration is difficult to use for the purpose of stopping the reaction at the desired intermediate point and it is preferred to produce the molding compositions of the invention under room temperature conditions (preferably at a relatively constant temperature in the range of 70° F. to 80° F.).

Polyepoxides melting at about room temperature or higher require heating or solvent to enable the required mixing and are not operable to produce void-free molded products. Specifically, thorough mixing at substantially room temperature is not feasible, even with semi-solid polyepoxide. The polyepoxides may include proportions of monoepoxides such as commercially available materials of this type as for example Epon 815 and Epon 820 (Shell Chemical Company) and ERL–2795 (Bakelite) and they may also contain proportions of higher melting polyepoxides such as Epon 864, Epon 1001 or Epon 1004 which are dissolved in the normally liquid polyepoxides which form the major portion of the polyepoxide component which is employed.

As will be appreciated, a large number of polyepoxides of low melting point may be used. Various of these are described in Patent 2,801,229, attention being directed to the description of suitable glycidyl polyethers presented at column 2, line 5—column 3, line 75 which may be employed in the present invention. Attention is also directed to the specific description of polyether "A" and "E" which sets forth specific aliphatic and aromatic polyethers which may be employed in the present invention.

For purposes of illustration, the invention will be illustrated using the diglycidyl ether of Bis-phenol A set forth as polyether A of Patent 2,801,229. A commercially available polyepoxide substantially identical with said polyether A is Epon 828 of Shell Chemical Co. It will be understood in the description which follows that the designation "polyether A" refers to a polyether prepared as set forth in Patent 2,801,229 and also to Epon 828 since both were employed interchangeably with substantially identical results.

Various aromatic polyamines may be used, these preferably being primary diamines. Meta-phenylene diamine is particularly preferred, although isomers thereof may be used. Methylene dianiline is a further preferred aromatic polyamine. Those mixtures of meta-phenylene diamine and methylene dianiline known as "Z" catalyst, a product of Shell Chemical Company are especially preferred. They contain about 60 parts of methylene dianiline to 40 parts of meta-phenylene diamine providing outstanding properties in the cured product.

Other primary diamines which may be used are 2,4-diamino toluene, 3,6-diamino carbazole, and menthane diamine.

In general, there may be used about 0.12 to 0.75 mol of polyamine per epoxide equivalent weight of the polyether. From 0.2 to 0.4 mol of polyamine per epoxide equivalent weight constitutes the preferred proportion.

It is critical to the stability of the resinous product that the polyepoxide has a minimum water content to an extent obtainable by heating the polyepoxide between 100–125° C. under conditions of vacuum of about 26 to 29 inches of mercury.

Loading of the molding composition with mineral filler is essential. The mineral filler must be dry and is preferably baked in an oven at a temperature above 100° C. to insure removal of any moisture which may be adsorbed or otherwise contained in the filler. Water is detrimental since it catalyzes reaction to disturb stability and leads to the production of voids in the molded product which are highly undesirable. Water in the molded product also impairs electrical properties.

Sufficient mineral filler should be present to provide a "back pressure" under molding pressures, the back pressure functioning to force entrapped air particles out of the molded product which is produced. Normally, at least 25% by weight based on the weight of the molding composition is necessary to provide adequate back pressure to eliminate entrapped air. Preferably, from 30% to 60% of mineral filler is used, filler addition to the liquid polyepoxide producing a viscous mastic material which forms the reaction medium in which curing to an intermediate fusible condition takes place. About 70% of mineral filler represents an approximate upper limit to the proportion of filler which can be forced into the molding composition.

The mineral filler is provided in finely divided particulate form. The average particle diameter is desirably less than 40 microns. Preferred fillers have average particle sizes between 5 and 10 microns.

The filler performs several functions among which are the provision of enhanced strength, toughness and impact resistance in the cured molded product. Fibrous reinforcing materials of a mineral nature such as asbestos and glass fiber may also be used and their introduction into the viscous mastic reaction medium is a feature of the invention as will be more fully explained hereinafter.

The mineral fillers are preferably neutral or only slightly basic, and should not catalyze the curing reaction at low temperatures. Thus, bentonite, highly alkaline clays and fillers with salt coatings, e.g., Surfex MM, cannot be used since they prevent storage stability.

Preferred fillers are calcium carbonate and barium sulfate, ground asbestos and ground glass, titanium dioxide, zirconium dioxide and powdered alumina, mica and talc. Harder fillers such as flint powder and quartz are usable but are generally unduly hard for most mold surfaces and tend to score the same. Optimum electrical properties are frequently obtained using combinations of fillers, e.g., calcium carbonate and barium sulfate. Small amounts of titanium dioxide may desirably be included for best electrical properties.

The maximum proportion of filler on a weight basis which can be tolerated with good handling characteristics depends upon the particle size and density of the filler. Generally, light weight fillers such as asbestos are used in smaller proportions; medium weight fillers such as talc and alumina are usable in intermediate proportions and denser fillers may be used in larger proportions up to about 70% by weight.

The fatty acids which are employed in accordance with the invention are saturated materials solid at room temperature. More particularly, the fatty acids are to contain at least 10 carbon atoms in the molecule. Preferably, these acids should contain from 14 to 18 carbon atoms in the molecule and the preferred materials are straight chain saturated fatty acids. Outstanding results have been achieved with stearic acid. Myristic and palmitic acid provide good results. Higher molecular weight fatty acids may be used, lignoceric acid containing 24 carbon atoms representing the upper limit of commercially available acids. The lower fatty acids, e.g., capric acid and lauric acid may be used but are less preferred.

The proportion of fatty acid is critical in accordance with the invention. When less than 0.15% by weight, based upon the weight of the molding composition is employed, an effective mold-release action is not achieved and the molding composition adheres to the chrome, aluminum or steel molds which are in commercial use. On the other hand, when greater than about 2% by weight of acid is employed based on the weight of the molding composition, a surface exudation may take place which could be detrimental.

In the prior art, the polyepoxide-polyamine reaction to produce a fusible intermediate reaction product was achieved (as in Patent 2,801,229) by heating the reaction mixture and then cooling to stop the reaction when the desired intermediate cure had been achieved. More specifically, the mixture was heated to at least 50° C. and permitted to react at this temperature.

When the reaction mixture is heated to a temperature above 50° C., the resinification reaction tends to lead directly to an infusible product and it is necessary to stop the reaction, as by cooling. Moreover, the resinification reaction is exothermic with the reaction becoming more rapid with the temperature increase which results from the heat of reaction. Accordingly, the resinification reaction must be carefully observed so that the reaction may be stopped at the proper point. In the prior art, the necessity to stop the reaction at the proper time has made it difficult to reproducibly achieve any given stage of the resin advance.

When the reaction mass is a viscous mastic material (resembling a putty) cooling is difficult and it is important in order to reproducibly achieve molding compositions which have been uniformly advanced to a given stage of fusibility, to provide a reaction procedure which will proceed in and of itself and without control, to a given stage of resin advance.

In accordance with the invention, mineral filler is mixed with a portion of the liquid polyepoxide component with the proportion of polyepoxide being limited to provide a putty. This putty is then subjected to high shearing forces (as in a Baker-Perkins mixer) to produce a uniform dispersion of the mineral filler in the liquid polyepoxide. It is important that the mixture which is sheared be of putty consistency. This is because a lower viscosity, e.g., the viscosity of a heavy cream or a thick molasses, is inadequate to enable the finely divided particles of filler material to be separated from one another. Unless a mass of putty consistency is subjected to strong shearing forces, the very small particles of filler (40 microns or less) are inadequately separated and the molded product lacks uniformity. There is also a tendency to form voids in the molded product which is produced.

The uniformly admixed putty containing mineral filler and liquid polyepoxide is then reduced in viscosity by the addition thereto of a further portion of liquid polyepoxide. This reduction in viscosity is essential because the polyamine, even when suitably dispersed in liquid polyepoxide, cannot be mixed with the putty without producing localized areas which are inadequately mixed and which, therefore, overheat leading to an uncontrollable reaction.

The polyamine component is admixed with a still further portion of liquid polyepoxide and the mixture of polyamine in liquid polyepoxide produced in this manner is then intimately mixed with the mineral filler-liquid polyepoxide admixture of reduced viscosity.

It is essential in accordance with the invention that the mixture of mineral filler with liquid polyepoxide into which the polyamine-containing mixture is incorporated be at a temperature of less than 45° C. If this is not done, the reaction runs away toward the "C" stage and it is necessary to employ a positive cooling step in order to stop the reaction at the desired point.

The mixture of polyamine and liquid polyepoxide is generally at a temperature less than 40° C. (normally at a temperature of 25 to 27° C.) whereby, after admixture with the mineral filler-liquid polyepoxide material, a thick, mastic mixture having a temperature less than 45° C. is produced.

It is essential in accordance with the invention that the viscous mastic admixture comprising polyepoxide, polyamine and mineral filler be formed into a mass having a thickness of less than about ⅝". This mass is normally formed by extruding the viscous mixture into sheet form. It is essential that the viscous mixture at the time of extrusion have a temperature of less than 45° C. since otherwise the reaction will advance toward the "C" stage, and it becomes necessary to stop the reaction at the desired point.

The low temperature (below 45° C.) mass (sheet) is then exposed to a temperature of from about 55° F. to about 90° F. This temperature is normally provided by extruding the sheet in a gaseous atmosphere (air) which is at approximately room temperature.

At ambient temperatures below 55° F., the mixture does not cure. At temperatures above 90° F., the mixture cures toward the "C" stage and it is again necessary to stop the reaction at the desired point.

In accordance with the invention, the resinification reaction proceeds differently. Specifically, the reaction proceeds slowly to produce a fusible composition which can be molded at pressure from 500 p.s.i. to 1500 p.s.i. at a temperature of from 230° F. to 315° F. to cure during molding to a void-free infusible mold product. Uniquely, the reaction between the polyepoxide and the polyamine slows down when this mass is exposed to a temperature of 55° F. to 95° F. so that the reaction stops automatically at the desired stage of fusibility and does not proceed beyond this point by itself. Accordingly, the necessity to stop the reaction is completely eliminated because the reaction stops itself. The cured composition at room temperature remains moldable for many weeks. Even at 85° F., the composition remains moldable for a period of 5 to 6 weeks.

When the molding powder is to be provided with an internal release agent as is preferred in accordance with the invention, the solid fatty acid is dispersed in a portion of liquid polyepoxide and this is preferably admixed with the mineral filler-polyepoxide mixture after the viscosity of the same has been reduced as aforesaid.

To produce the highest mechanical strength in the molded product, it is desirable to include in the composition a minor proportion, e.g., 5–20 percent by weight of glass in fiber form. The glass preferably is comminuted to have a length of about ¼" to ¾" (preferably ½"). The glass is preferably of fine diameter, e.g., the glass designated as No. 801 by Owens-Corning Fiberglas Corp.

The importance of fiber introduction in accordance with the invention is the addition of the fiber as the final component to the viscous final admixture prior to extrusion thereof into sheet form. If the glass is added at an earlier point in the mixing procedure, the viscosity of the mixture is increased greatly so that the heat of mixing of the fiber-containing mixture forces the final admixture to cure directly into an infusible condition unless the reaction is stopped by cooling, when the desired resin advance has been achieved.

The invention is illustrated in the following three examples identified as A, B and C, in which all parts are by weight. It will be understood that the formulations presented are illustrative and are not intended to limit the invention. Formulations A and B illustrate preferred compositions including fibrous glass and within the preferred proportions of the preferred fatty acid, e.g., stearic acid. Formulation C illustrates a preferred composition excluding fibrous glass.

|  | Formulations | | |
| --- | --- | --- | --- |
|  | A | B | C |
| 1. Polyether A (Viscosity 50–150 cps. at 25°C.) | 625.00 | 625.00 | 761.00 |
| 2. Calcium carbonate (National Kaolin Products Champion Clay) | 644.00 | 644.00 | 779.00 |
| 3. Barium sulfate (Harshaw Chemical Co.—White) | 690.00 | 690.00 | 970.00 |
| 4. Polyether A | 179.00 | 179.00 | 57.00 |
| 5. Stearic acid U.S.P | 7.50 | 4.15 | 4.90 |
| 6. Polyether A | 78.10 | 78.10 | 57.00 |
| 7. Polyether A | 117.20 | 117.20 | 125.00 |
| 8. Meta phenylene diamine | 72.00 | 72.00 | 61.20 |
| 9. Methylene dianiline | 108.00 | 108.00 | 91.80 |
| 10. Fibrous glass (Owens-Corning Fiberglas Corp. #801 length ½") | 344.00 | 344.00 |  |
| Total | 2,864.80 | 2,861.45 | 2,906.90 |

In the foregoing illustrative formulations, components 1, 2 and 3 (all of the filler with only a limited portion of polyepoxide) are mixed together with a heavy-duty Baker Perkins mixer for a period of 60–90 minutes. Component 4 (additional liquid polyepoxide) is then added to reduce viscosity (mixing time 20 minutes). Components 5 and 6 are then mixed together and the mixture is dispersed in the polyepoxide-mineral filler admixture, suitable mixing normally requiring 25 minutes. Components 7, 8 and 9 (the polyamine component together with a still further portion of liquid polyepoxide) are then mixed together and the mixture is incorporated in the mixture of components 1–6, this normally requiring a mixing time of about 10 minutes. The temperature of the mixture of components 1–6 at the time of incorporation of components 7, 8 and 9 was 38–43° C. The temperature of the admixture of components 7, 8 and 9 began to rise immediately after admixture thereof. At the time of addition of mixture 7, 8 and 9 to mixture 1–6, the temperature of mixture 7, 8 and 9 was from 25 to 27° C. As a result of further temperature increase, as a result of mixing and heat of reaction, the temperature of the final mixture was about 2° C. lower than the temperature of mixture 1–6. As a last step, the fibrous glass was mixed in a period of about 15 minutes.

When the temperature of mixture 1–6 is above 45° C., it is permitted to cool. Preferably, the temperature of this mixture 1–6 is below 43° C.

The following formulations D, E, F, G, H, I, and J are illustrative of molding compositions containing more than 0.26% of stearic acid, however molded parts made therefrom showed no surface exudation of stearic acid.

ing composition is substantially the same as that produced after 24 hours cure, e.g., the molding composition is well advanced although it is still easily fusible at temperatures below 315° F.

The formulations A, B and C were also sheeted at thicknesses of ⅛″, ¼″ and ½″ and excellent results were produced in each instance. The pre-formed sheets were also subjected to temperatures varying from 55–90° F. and excellent results were again produced. At tempreatures below 55° F., the reaction did not proceed to produce a molding composition which would not become excessively fluid when subjected to 1,000 p.s.i. and 230° F. At temperatures above 90° F., the molding composition did not flow satisfactorily even at temperatures of about 320° F.

The resin compositions of the invention may be satisfactorily molded at temperatures of 230 to 315° F. using pressures of from 500 to 1500 p.s.i. With the resin advancement uniformity achievable by the invention, it is possible to produce molding compositions which flow easily at 300° F. and which, nevertheless, provide adequate "back-up" to eliminate void formation in the cured product. Of importance is the fact that these characteristics can be uniformly produced from batch to batch.

The fillers in the foregoing formulations and also the fibrous reinforcement were all baked in an oven to eliminate introduction of water into the molding composition.

The molding compositions in sheet form are preferably comminuted to form a powder or broken to form small pieces (or originally formed into pellet shape for curing). When the reaction is completed, the molding composi-

|  | Formulations | | | | | | |
|---|---|---|---|---|---|---|---|
|  | D | E | F | G | H | I | J |
| 1. Polyether A | 29.34 | 28.76 | 29.34 | 29.34 | 29.34 | 29.34 | 590 |
| 2. Clay (Champion Clay from National Kaolin Products) | 17.57 | 20.98 | 18.07 | 18.57 | 19.07 | 19.13 | 385 |
| 3. Barium sulfate (Harshaw Chemical Co.—White) | 40.00 | 39.22 | 40.00 | 40.00 | 40.00 | 40.00 | 800 |
| 4. Polyether A | 3.26 | 3.20 | 3.26 | 3.26 | 3.26 | 3.26 | 66 |
| 5. Stearic acid, U.S.P | 2.00 | 1.96 | 1.50 | 1.00 | 0.5 | 0.34 | 6.8 |
| 6. Methylene dianiline | 2.94 |  | 2.94 | 2.94 | 2.94 | 2.94 | 98.2 |
| 7. Menthane diamine | 4.89 | 2.94 | 4.89 | 4.89 | 4.89 | 4.89 |  |
| 8. 2,4-diamino toluene |  | 2.94 |  |  |  |  |  |
| 9. 3,6-diamino carbazole |  |  |  |  |  |  | 54.8 |
| Total | 100.00 | 100.00 | 100.00 | 100.00 | 100.00 | 100.00 | 2,000.8 |

The final admixture is then extruded into sheet form, it being essential that extrusion to produce a sheet take place before the reaction temperature has exceeded 45° C. Thus, the reaction mass will heat up beyond 45° C. unless it is sheeted and if such heating takes place, e.g., to a temperature of 50° C., the reaction will not stop automatically to produce a molding composition which is fusible. Instead the reaction proceeds directly to produce an infusible resin. In each of formulations A, B and C, successful results were produced with the temperature of the mixture being at 45° C. and lower. At lower temperatures, the mixture warmed after the sheet was formed. At higher temperatures, the reaction ran away and it was necessary to take positive action as by cooling in order to stop it at the desired point.

The extruded sheet is placed in an atmosphere having a temperature of 75° F. and the reaction proceeds in about 3 hours to produce a fusible molding composition. Preferably, the sheet which had a thickness of ⅝″ is permitted to remain in the room temperature medium (75° F.) for at least 24 hours to achieve full resin advance without producing infusibility. After 48 hours, the moldtion is stored at temperatures of 45° F. or lower, at which temperatures they will remain suitably fusible indefinitely, e.g., for periods of over a year. Commercial molders who purchase the molding compositions of the invention may maintain these at room temperature for periods of six weeks and longer even during the summer months.

The stage of intermediate resinification which is achieved in accordance with the invention may be broadly defined as having a minimum enabling molding of void-free discs having a diameter of 4″ and a thickness of ⅛″ by the application of 1,000 p.s.i. in a plunger-type compression mold at a temperature of 230° F. The maximum stage of resin advance may be broadly defined as producing sufficient limited flow to form a void-free molding when compression molded into a disc as aforesaid, by the application of 1,000 p.s.i. and a temperature of 315° F., higher temperatures above 315° F. producing excessively fluid conditions and the entrapment of air within the molding product.

The molded products which are produced by the invention may be post-cured if desired but such post-cure is not essential. The properties produced in the molded products of the invention are illustrated in the table which follows, said tests having been conducted on the product of formulation A containing 5.0 parts of stearic acid, U.S.P. In this table, when a method of test is specified, the code numbers used refer to the standard A.S.T.M. methods.

*Electrical Properties*

[5 minutes—300° F.—1000 p.s.i.]

|  | No post cure | Post cure, 300° F., 4 hours |
|---|---|---|
| Arc resistance time, seconds (Method D 495–48T): | | |
| Average | 148.0 | 154.5 |
| Minimum | 142.1 | 143.4 |
| Surface breakdown ratio (Method D 495–48T): | | |
| Average | .033 | .033 |
| Minimum | .033 | .033 |
| Dielectric strength, volts/mil (Method D 149–55T)— | | |
| Short time: | | |
| Average | 433 | 411 |
| Maximum | 468 | 466 |
| Minimum | 419 | 372 |
| Step by step: | | |
| Average | 384 | 382 |
| Maximum | 419 | 450 |
| Minimum | 369 | 334 |
| Volume resistivity, ohms-cm. (Method D 257–54T) | $105.5 \times 10^{12}$ | $104.5 \times 10^{12}$ |
| Surface resistivity, ohms (Method D 257–54T) | $63.6 \times 10^{12}$ | $63.6 \times 10^{12}$ |
| Insulation resistance (Method D 257–54T) | [1] Infinity | [1] Infinity |
| Dielectric constant, average (Method D 150–54T): | | |
| 60 cycle | 5.43 | 5.20 |
| 50 kilocycle | 4.87 | 4.79 |
| 1 megacycle | 4.63 | 4.39 |
| 10 megacycle | 4.51 | 4.45 |
| Power factor, average (Method D 150–54T): | | |
| 60 cycle | .038 | .023 |
| 50 kilocycle | .0233 | .0252 |
| 1 megacycle | .0241 | .0265 |
| 10 megacycle | .0265 | .0266 |
| Loss factor, average (Method D 150–54T): | | |
| 60 cycle | .207 | .119 |
| 50 kilocycle | .114 | .120 |
| 1 megacycle | .111 | .111 |
| 10 megacycle | .119 | .118 |

[1] Relative humidity 49% at 25° C.

*Physical Properties*

[5 minutes—300° F.—1000 p.s.i.]

|  | Izod impact (ft.-lbs./inch of notch) | Method |
|---|---|---|
| No post cure | .808 | |
| 300° F.—1 day | .792 | |
| 300° F.—3 days | .800 | |
| 300° F.—7 days | .739 | D 256–54T |
| 400° F.—1 day | .707 | |
| 400° F.—3 days | .744 | |
| 400° F.—7 days | .715 | |

|  | Flexural strength, average (p.s.i.) |  |
|---|---|---|
| 400° F.—1 day | 15,750 | |
| 400° F.—3 days | 13,040 | D 790–49T |
| 400° F.—7 days | 11,740 | |

|  | Modulus of elasticity (p.s.i.) |  |
|---|---|---|
| 400° F.—1 day | $1.27 \times 10^6$ | |
| 400° F.—3 days | $1.33 \times 10^6$ | D 790–49T |
| 400° F.—7 days | $1.535 \times 10^6$ | |

*Chemical Resistance Range*

[5 minutes—300° F.—1000 p.s.i.]

| Disc size | 2″ × 1/16″. |
|---|---|
| Post cure | 1 hour at 300° F. |

Legend:
E _____ Edge thickness, percent.
D _____ Diameter, percent.
W _____ Weight, percent.

PHYSICAL CHANGES UPON IMMERSION

| Chemical | 7 days | 30 days | 90 days | 180 days | Visual inspection at 180 days |
|---|---|---|---|---|---|
| Tap water: | | | | | |
| E | 0. | 0 | 0 | 0 | OK No discoloration; no delamination; no physical deterioration. |
| D | 0.07 | 0.165 | 0.29 | 0.32 | |
| W | 0.35 | 0.78 | 1.09 | 1.17 | |
| H₂O₂, 30%: | | | | | |
| E | 0 | 0.675 | 7.3 | ------- | Partial delamination. |
| D | 0 | 0.13 | 0.35 | ------- | |
| W | 0.575 | 1.53 | 6.59 | ------- | |
| Chromic acid, 25%: | | | | | |
| E | 0 | −6.21 | −15.19 | −16.61 | Light gray discoloration. |
| D | 0 | −0.06 | −0.15 | −0.30 | |
| W | −1.17 | −8.64 | −20.00 | −26.16 | |
| Concentrated H₂SO₄, 96.4%. | | Disc disintegrated in 3 days | | | |
| Dil. H₂SO₄, 1%: | | | | | |
| E | 0 | 0 | 0 | 0 | Light green color, traces of glass showing. |
| D | 0 | 0.07 | 0.19 | 0.20 | |
| W | 0.34 | 0.74 | 1.00 | 0.96 | |
| Concentrated HNO₃, 70%. | | Disc disintegrated in 3 days | | | |
| Dil. nitric acid, 1%: | | | | | |
| E | 0 | 0 | 0 | 0 | Dark green. |
| D | 0.035 | 1.17 | 0.21 | 0.28 | |
| W | 0.32 | 0.53 | 1.04 | 1.10 | |
| Acetic acid, 80%: | | | | | |
| E | 0 | 0 | 0 | 0.73 | Olive drab. |
| D | 0 | 0.35 | 0.08 | 0.10 | |
| W | 0.16 | 0.39 | 0.72 | 1.19 | |
| 50% caustic: | | | | | |
| E | 0 | 0 | 0 | 0 | OK. |
| D | 0 | −0.035 | −0.045 | −0.065 | |
| W | −0.07 | −0.10 | −0.16 | −0.18 | |
| Dilute caustic, 2%: | | | | | |
| E | 0 | 1.52 | 0 | 0.77 | Traces of glass showing. |
| D | 0.45 | 0.15 | 0.23 | 0.25 | |
| W | 0.35 | 0.74 | 1.02 | 1.05 | |
| Benzene: | | | | | |
| E | 0 | 0 | 0 | 0 | OK. |
| D | 0 | 0 | 0 | 0 | |
| W | 0.088 | 0.28 | 0.14 | 0.185 | |
| 90% phenol: | | | | | |
| E | 0 | 0 | 0.76 | 1.52 | Light brown color, glass beginning to show. |
| D | 0 | 0.08 | 0.12 | 0.12 | |
| W | 0.23 | 0.525 | 0.825 | 0.99 | |
| M.B.K.: | | | | | |
| E | 0 | 0.76 | 0.76 | 0 | Light brown color. |
| D | 0 | 0 | 0 | 0 | |
| W | −0.025 | 0.22 | 0.27 | 0.775 | |
| Gasoline: | | | | | |
| E | 0 | 0.80 | 0 | 0.79 | OK. |
| D | 0 | 0 | 0 | 0 | |
| W | 0.07 | 0.14 | 0.08 | 0.15 | |
| Carbon tet.: | | | | | |
| E | 0 | 0 | 0 | 0 | OK. |
| D | 0 | 0.07 | 0 | 0.035 | |
| W | 0.065 | 0.26 | 0.105 | 0.15 | |
| Phosphoric acid, 75%: | | | | | |
| E | 0 | 0 | 0 | 0 | Dark green coloring. |
| D | 0 | 0 | 0 | 0 | |
| W | 0.028 | 0.07 | 0.115 | 0.22 | |
| Conc. HCl, 37%: | | | | | |
| E | 1.5 | 4.49 | 7.60 | 12.78 | Red and green mottled effect. |
| D | 0 | 0.08 | 0.22 | 0.64 | |
| W | 0.99 | 3.20 | 5.99 | 8.92 | |
| Dil. HCl, 1%: | | | | | |
| E | 0 | 0 | 0 | 0.76 | Dark green. |
| D | 0.32 | 0.36 | 0.40 | 0.57 | |
| W | 0.285 | 0.675 | 0.935 | 0.95 | |

*Heat Test*

Molded samples retain good strength, chemical and electrical properties after being maintained at 400° F. for seven days.

HEAT DISTORTION

| Time (Hrs.) | Temperature, ° C. | Heat distortion temperature, ° C. | Method |
|---|---|---|---|
| 2 | 150 | 98.5 | LP 406B #2011 |
| 3 | 150 | 105.5 | LP 406B #2071 |
| 4 | 125 | 136.5 | LP 406B #2071 |

With respect to certain tests as is evident from the foregoing table, post-cure may provide additional advantages and the data provides insight on the best aging properties of the molded products.

Molded samples under the Heat Test subsections were discs 4" in diameter and ⅛" in thickness. Otherwise the samples are as specified by the A.S.T.M. test procedures indicated in the table parenthetically.

The molding composition (Formulation A) employed for determining the test data above has been determined to be capable of duplicating the above test data after storage at 45° F. for 18 months. The composition prior to molding was permitted to warm to room temperature while packed in a plastic (polyethylene) bag to prevent moisture pick-up. The specific gravity of the cured, molded product is 1.8 and in the cured condition, the product is light tan in color.

This application is a continuation-in-part of my copending application Serial Number 700,768, filed December 5, 1957, now abandoned.

The invention is defined in the claims which follow:

1. A dry fusible approximately neutral to slightly alkaline mineral filler-loaded polyepoxide resin thermosetting molding composition comprising in intimate admixture, (1) a solid fusible intermediate reaction product of (A) glycidyl polyether liquid at room temperature and having a 1,2 epoxy equivalency greater than 1.0 and (B) aromatic polyamine having primary amino groups as the sole reactive groups as curing agent for said polyether; (2) high molecular weight saturated fatty acid containing at least 10 carbon atoms in the molecule and solid at room temperature in an amount of from 0.15 to 0.26% by weight based on the weight of the molding composition; and (3) dry approximately neutral to slightly alkaline mineral filler in finely divided particulate form, in an amount of from 25–70% by weight based on the weight of the molding composition, said molding composition being indefinitely stable when stored at temperatures below 45° F. and being stable for at least about 5 weeks at room temperature and adapted to be molded and cured to a thermoset condition by the application of pressures of from 500–1500 p.s.i. and temperatures of from 230–315° F. for from about 3 to about 10 minutes.

2. A molding composition as recited in claim 1 in which said aromatic polyamine is a primary diamine and said molding composition consists essentially of said components (1), (2), and (3).

3. A molding composition as recited in claim 2 in which said diamine comprises meta-phenylene diamine.

4. A molding composition as recited in claim 1 in which said polyamine is present in an amount of from 0.12 to 0.75 mol per epoxide equivalent weight of said polyether.

5. A molding composition as recited in claim 1 in which said polyether has a 1,2-epoxy equivalency of about 2.0.

6. A molding composition as recited in claim 5 in which said polyether comprises a poly glycidyl ether of 2,2'-diphenylol propane.

7. A molding composition as recited in claim 1 in which said fatty acid is a straight chain fatty acid containing from 14–18 carbon atoms in the molecule.

8. A molding composition as recited in claim 7 in which said fatty acid is stearic acid.

9. A molding composition as recited in claim 1 in which said filler has an average particle size less than about 40 microns in diameter.

10. A molding composition as recited in claim 9 in which said filler has an average particle size between 5 and 10 microns.

11. A molding composition as recited in claim 1 in which said dry mineral filler is present in an amount of from 30% to 60% by weight based on the weight of the molding composition.

12. A method of preparing a fusible molding composition from initial components comprising liquid polyglycidyl ether having a 1,2-epoxy equivalency greater than 1.0, aromatic polyamine having primary amino groups as the sole reactive groups in an amount of from 0.12 to 0.75 mol of polyamine per epoxide equivalent weight of said polyether and approximately neutral to slightly alkaline mineral filler having an average particle diameter less than about 40 microns in an amount of from 25 to 70% by weight based on the weight of the molding composition comprising mixing said mineral filler with a portion of said liquid polyepoxide to a putty consistency, subjecting said putty to high shearing forces to produce a uniform dispersion of said mineral filler in said liquid polyepoxide, reducing the viscosity of said uniform dispersion by adding a further portion of liquid polyepoxide thereto, admixing from 0.15 to about 2% by weight biased on the weight of the molding composition of a high molecular weight, saturated, fatty acid containing at least 10 carbon atoms in the molecule and solid at room temperature in a portion of liquid polyepoxide and adding said mixture to the liquid polyepoxide mineral filler dispersion, admixing said polyamine with a still further portion of liquid polyepoxide and then intimately mixing said polyamine-containing mixture with said uniform dispersion of reduced viscosity at a temperature less than 45° C., forming the resulting admixture while at a temperature less than 45° C. into a mass having a thickness of less than about ⅝ inch and permitting said mass to react in a medium having a temperature of from about 55° F. to about 90° F., whereby said admixture reacts slowly to produce a fusible composition adapted to be molded at pressures of from 500 p.s.i. to 1500 p.s.i. at a temperature of from 230–315° F. to cure during molding to void-free infusible molded product, and whereby said reaction substantially stops at said fusible condition without change of the temperature of said medium.

13. A method as recited in claim 12 in which said medium is a gaseous atmosphere.

14. A method as recited in claim 12 in which said particulate filler is baked to dry the same prior to admixture thereof with said liquid polyepoxide.

15. A method as recited in claim 12 in which a fatty acid containing at least 10 carbon atoms in the molecule and solid at room temperature in an amount of from 0.15 to 0.26% by weight based on the weight of said molding composition is incorporated in said mixture of mineral filler and polyepoxide.

16. A method as recited in claim 12 in which fibrous glass having a length of from ¼ to ¾ inch is admixed with the admixture containing liquid polyepoxide, aromatic amine and mineral filler.

17. A method as recited in claim 12 in which said admixture of liquid polyepoxide, aromatic amine and mineral filler is extruded in the form of a sheet at a temperature of from 38 to 42° C. into air at room temperature.

18. A dry fusible approximately neutral to slightly alkaline mineral filler-loaded polyepoxide resin thermosetting molding composition comprising in intimate admixture, (1) a solid fusible intermediate reaction product of (A) glycidyl polyether liquid at room temperature and having a water content not in excess of that retained by heating at a temperature of 100–125° C. under a vacuum of 26–29 inches of mercury and having a 1,2-epoxy equivalency greater than 1.0 and (B) aromatic polyamine having primary amino groups as the sole reactive groups as curing agent for said polyether; (2) high molecular weight saturated fatty acid containing at least 10 carbon atoms in the molecule and solid at room temperature in an amount of from 0.15 to 0.26% by weight based on the weight of the molding composition; and (3) dry approximately neutral to slightly alkaline mineral filler in finely divided particulate form in an amount of from 25-70% by weight based on the weight of the molding composition.

19. A dry fusible approximately neutral to slightly alkaline mineral filler-loaded polyepoxide resin thermosetting molding composition comprising a solid fusible mixture produced by intimately mixing glycidyl polyether liquid at room temperature and having a 1,2-epoxy equivalency greater than 1.0, aromatic polyamine having primary amino groups as the sole reactive groups in an amount of from 0.12 to 0.75 mol per epoxide equivalent weight of said polyether, dry approximately neutral to slightly alkaline mineral filler in finely divided form in an amount of from 25-70% by weight based on the weight of the molding composition and high molecular weight saturated fatty acid containing at least 10 carbon atoms in the molecule and solid at room temperature in an amount of from 0.15 to 0.26% by weight based on the weight of the molding composition, forming said admixture while at a temperature less than 45° C. into a mass having a thickness of less than about 5/8 inch and permitting said mass to react in a medium having a temperature of from about 55° F. to about 90° F. to cause said polyether and said aromatic polyamine to react slowly to produce an intermediate resinification, said intermediate resinification being at least sufficient to enable molding of void-free disks having a diameter of 4 inches and a thickness of 1/8 inch by the application of 1000 p.s.i. at 230° F. and insufficient to cause entrapment of air in the molding of said disks at 1000 p.s.i. at a temperature of 315° F.

20. A dry fusible approximately neutral to slightly alkaline mineral filler-loaded polyepoxide resin thermosetting molding composition comprising in intimate admixture, (1) a solid fusible intermediate reacton product of (A) glycidyl polyether liquid at room temperature and having a 1,2-epoxy equivalency greater than 1.0 and (B) aromatic polyamine having primary amino groups as the sole reactive groups as curing agent for said polyether; (2) high molecular weight saturated fatty acid containing at least 10 carbon atoms in the molecule and solid at room temperature in an amount of from 0.15 up to about 2% by weight based on the weight of the molding composition; and (3) dry approximately neutral to slightly alkaline mineral filler in finely divided particulate form, in an amount of from 25-70% by weight based on the weight of the molding composition, said molding composition being indefinitely stable when stored at temperatures below 45° F. and being stable for at least about 5 weeks at room temperature and adapted to be molded and cured to a thermoset condition by the application of pressures of from 500-1500 p.s.i. and temperatures of from 230-315° F. for from about 3 to about 10 minutes.

References Cited in the file of this patent
UNITED STATES PATENTS

| | | |
|---|---|---|
| 2,681,901 | Wiles et al. | June 22, 1954 |
| 2,773,048 | Fermo et al. | Dec. 4, 1956 |
| 2,801,229 | De Hoff et al. | July 30, 1957 |
| 2,866,768 | Bolstad | Dec. 30, 1958 |